(No Model.)
G. R. DOLF.
METALLIC ROD PACKING.
No. 477,741. Patented June 28, 1892.
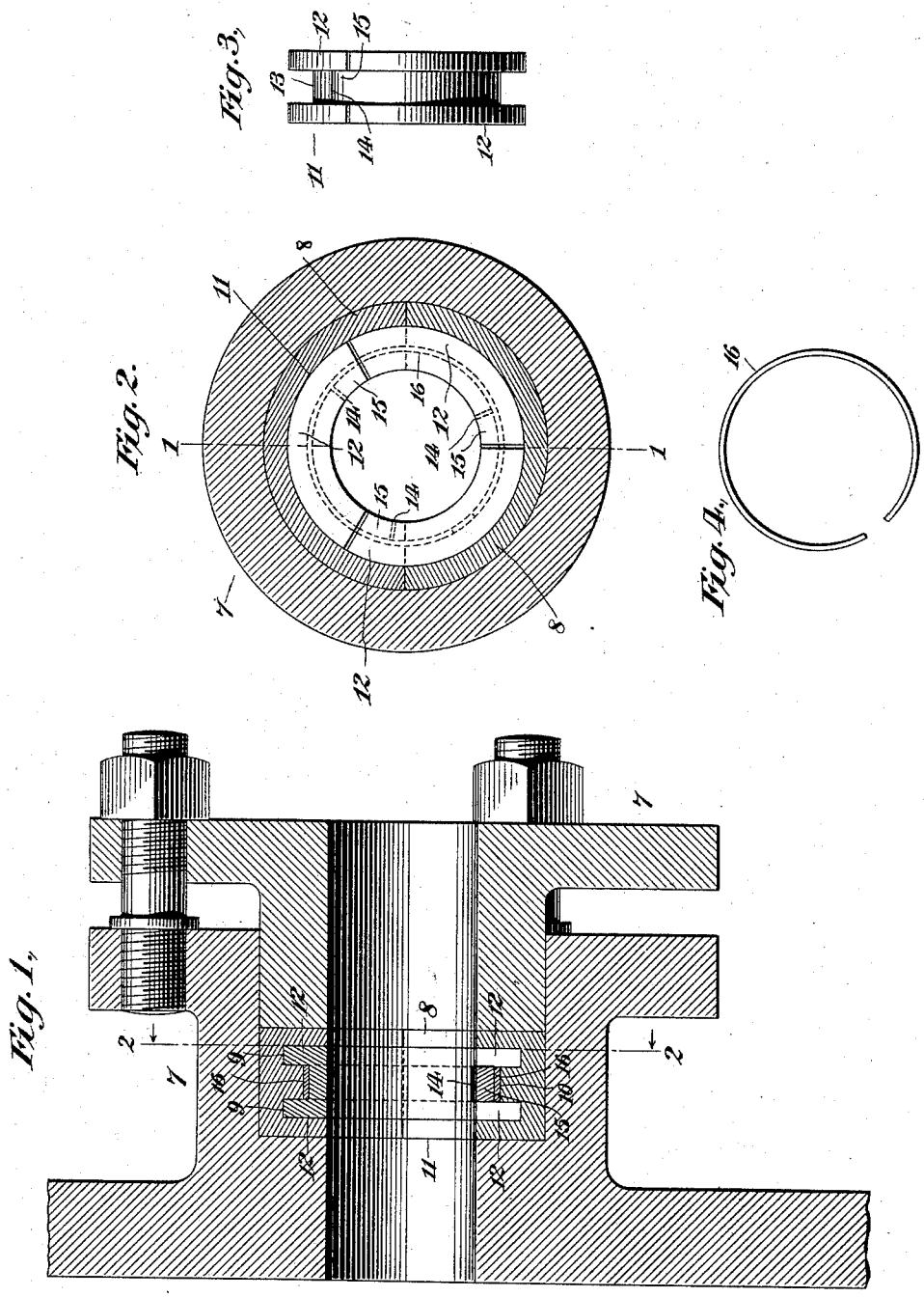
Witnesses
C. E. Ashley
H. W. Lloyd
Inventor
George R. Dolf
By his Attorneys
Fowler & Fowler

UNITED STATES PATENT OFFICE.

GEORGE R. DOLF, OF IRON MOUNTAIN, MICHIGAN.

METALLIC ROD-PACKING.

SPECIFICATION forming part of Letters Patent No. 477,741, dated June 28, 1892.

Application filed September 4, 1891. Serial No. 404,719. (No model.)

*To all whom it may concern:*

Be it known that I, GEORGE R. DOLF, a citizen of the United States, residing at Iron Mountain, county of Menominee, and State of Michigan, have invented certain new and useful Improvements in Self-Adjusting Metallic Piston-Rod Packing, of which the following is such a clear, full, and exact description as will enable any one skilled in the art to which it appertains to make and use the same, reference being had to the accompanying drawings, forming part of this specification.

My invention relates to a self-adjusting metallic packing for piston-rods; and it consists in the certain novel and peculiar arrangements and combinations of the several parts of the device, all as hereinafter fully described, and then pointed out in the claims.

In the accompanying drawings, illustrating my invention, Figure 1 is a sectional view of a stuffing-box divided with my improved packing, the plane of the section being indicated by line 1 1, Fig. 2. Fig. 2 is a sectional view, the plane of which is indicated by line 2 2, Fig. 1. Fig. 3 is an edge view of the sectional packing-ring shown detached. Fig. 4 is an edge view of the spring which binds the sections of the packing-ring together.

Referring to the drawings, in which like numbers of reference designate like parts, 7 is a stuffing-box of a cylinder, and 8 is a metallic ring, which is divided on a plane containing its axis. This ring, which I call the "outer ring," is placed within the stuffing-box, and each part of it may be conveniently provided with holes for removing it from the stuffing-box. The interior of this ring 8 is formed with, preferably, two annular grooves 9 9, extending parallel with each other and spaced suitably to form a prominent rib or annular projection 10 between the two. This annular rib 10 is of considerably less height than the ribs laying between the outer sides of the grooves and the sides of the ring, as is clearly shown in the cross-sections in the drawings, thereby insuring less leakage of steam. The inner or packing ring 11 is composed of sections 12 12, preferably three in number, and the outer face or periphery of each is formed with a circumferential groove 13 for receiving the annular rib 10 of the outer ring 8. Two ribs are thus formed, one on each edge of the ring, and they take into the grooves 9 9 of the outer ring. This construction serves to break the joint and prevent leakage, and at the same time holds the sectional packing-ring 11 securely in position against movement on its axis. One end of each section 12 of the packing-ring is formed with a groove or fork 14, while the other end thereof is formed with a tongue 15, which is less than the thickness of the ring by the depth of the groove. The tongue of one section interlocks with the groove of the next, and so on with all the sections, thus forming a lap-joint at the junction of the ends of the sections. The tongue-and-groove joints between the ends of the sections of the packing-ring are made sufficiently loose to allow for the contraction of the packing-ring, which may be due to the wear of the ring and of the piston-rod, which reciprocates through the same. The sections 12 of the packing-ring are surrounded by a circular spring 16, which lies in the bottom of the groove 13 of the ring, so as to be interposed between the ring and the rib 10 of the outer ring 8. This spring serves to force all the sections firmly in against the piston-rod, so as to give the minimum of clearance between the packing-ring and the piston. By virtue of this construction the packing-ring is self-adjusting, so that it compensates for wear, and thus maintains continually a very perfect steam-joint. It will thus be seen that both the wear of the bearing of the packing-ring and the wear of the piston-rod itself will be compensated for by the self-adjusting tendency of the metallic sections of the packing-ring, which under the influence of the spring are kept constantly under spring tension, and are thereby caused to bear snugly against the piston-rod.

The packing may be put together by first assembling the sections in ring-like form, then placing the spring about them, and inclosing these parts in the divided outer ring, which then may be inserted in the stuffing-box.

Having thus described my improvements in self-adjusting metallic packing, what I claim as my invention, and desire to secure by Letters Patent, is—

1. A self-adjusting metallic packing consisting in the combination, with a stuffing-box, of a divided outer ring formed upon its interior with continuous grooves, an inner packing-ring formed in sections having end lap-joints, with the outer faces or peripheries of the sections provided with circumferential ribs adapted to take into the grooves upon the inner face of said outer ring, and a spring interposed between the outer ring and the sectional packing-ring for holding the sections against the piston-rod.

2. A self-adjusting metallic packing consisting in the combination, with the stuffing-box, of an outer divided ring formed upon its interior with annular grooves, an inner packing-ring made up of sections provided with peripheral ribs for taking into the grooves of the said outer ring and each section provided at one end with a centrally-disposed tongue and at the other end with a groove for interlocking and forming a lap-joint with said tongue, and a spring interposed between the outer ring and the sectional packing-ring for holding the sections together and against the piston-rod.

3. A self-adjusting metallic packing consisting in the combination, with a stuffing-box, of an outer divided ring seated within the stuffing-box and formed upon its interior with continuous parallel grooves, an inner sectional packing-ring arranged within said divided ring and formed in sections having peripheral parallel ribs extending into the grooves of said divided ring, and a spring placed between the divided ring and the sectional ring and disposed between the said ribs of the latter, substantially as and for the purpose set forth.

In testimony whereof I have hereunto set my hand, this 1st day of September, 1891, in the presence of the two subscribing witnesses.

GEORGE R. DOLF.

Witnesses:
F. A. CRESWELL,
H. MCKINSTRY.